United States Patent
Medeiros et al.

(10) Patent No.: US 9,893,762 B2
(45) Date of Patent: Feb. 13, 2018

(54) METHOD AND ARRANGEMENT IN A DSL VECTORING SYSTEM

(71) Applicant: Telefonaktiebolaget LM Ericsson (publ), Stockholm (SE)

(72) Inventors: Eduardo Lins de Medeiros, Sundbyberg (SE); Per-Erik Eriksson, Stockholm (SE); Yezi Huang, Solna (SE); Chenguang Lu, Sollentuna (SE); Thomas Magesacher, Villach (AT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/509,210

(22) PCT Filed: Sep. 30, 2014

(86) PCT No.: PCT/SE2014/051135
§ 371 (c)(1),
(2) Date: Mar. 7, 2017

(87) PCT Pub. No.: WO2016/053153
PCT Pub. Date: Apr. 7, 2016

(65) Prior Publication Data
US 2017/0250731 A1    Aug. 31, 2017

(51) Int. Cl.
*H04K 1/10*    (2006.01)
*H04L 27/28*    (2006.01)
(Continued)

(52) U.S. Cl.
CPC ............ *H04B 3/32* (2013.01); *H04M 11/062* (2013.01)

(58) Field of Classification Search
CPC ........ H04B 3/32; H04M 11/062; H04M 3/304
(Continued)

(56) References Cited

U.S. PATENT DOCUMENTS

| | | | |
|---|---|---|---|
| 2010/0135374 A1* | 6/2010 | Kozek | H04M 3/304 375/227 |
| 2012/0320959 A1* | 12/2012 | Lu | H04B 3/32 375/224 |

(Continued)

FOREIGN PATENT DOCUMENTS

WO    2014098684 A1    6/2014

OTHER PUBLICATIONS

Lu et al. "A Fast Channel Estimation Method for Disorderly Leaving Events in Vectored DSL Systems"; 2011 IEEE International Conference on Communications; Jun. 5-9, 2011; Kyoto, Japan; pp. 1-6; IEEE; Piscataway, NJ.

*Primary Examiner* — Phuong Phu
(74) *Attorney, Agent, or Firm* — Coats & Bennett, PLLC

(57) ABSTRACT

Vector Control Entity and method therein for Disorderly Leaving Events, DLEs, causing Sudden Termination Change in a DSL system. The method comprises, when a DLE occurs on a line m in a vectored group of DSL lines, and the transmission on line m is, at least partly, continued: obtaining at least one error sample from CPEs connected to other lines in the vectored group of DSL lines, and calculating an estimate of the channel coefficients, H', changed due to the DLE. The estimate is calculated based on the at least one error sample, and thus a channel estimate is provided. The method further comprises modifying a downstream precoder, based on the channel estimate, such that retraining of the other lines in the vectored group due to the DLE is avoided. The estimate of the channel coefficients is calculated based on the model $H'=H+C\Lambda H$.

17 Claims, 5 Drawing Sheets

(51) Int. Cl.
*H04B 3/32* (2006.01)
*H04M 11/06* (2006.01)

(58) Field of Classification Search
USPC ............... 375/260, 257, 346, 219, 220, 222
See application file for complete search history.

(56) References Cited

U.S. PATENT DOCUMENTS

| | | | | |
|---|---|---|---|---|
| 2014/0161163 A1* | 6/2014 | Lu | ............................ | H04B 3/32 |
| | | | | 375/222 |
| 2015/0155913 A1* | 6/2015 | Lu | ............................ | H04B 3/32 |
| | | | | 375/222 |
| 2015/0341487 A1* | 11/2015 | Lu | ............................ | H04B 3/32 |
| | | | | 379/1.03 |

* cited by examiner

METHOD AND ARRANGEMENT IN A DSL VECTORING SYSTEM

TECHNICAL FIELD

The invention relates to a method and an arrangement in a Digital Subscriber Line, DSL, system, in particular to the handling of Disorderly Leaving Events, DLE, in a DSL vectoring system.

BACKGROUND

Vectoring technology cancels the FEXT (far-end crosstalk) between DSL lines, and therefore maximizes DSL system performance. Vectoring technology enables offering 100 Mbps per user with DSL lines e.g. between the end of a fiber network and the Customer Premises Equipment, CPE.

The Telecommunication Standardization Sector of the International Telecommunication Union, ITU-T, has been standardizing a vectoring standard G.993.5 [1], and the first recommendation of G.993.5 was approved on Apr. 22, 2010. The cancellation of the FEXT is done at the DSLAM (Digital Subscriber Line Access Multiplexer) side. The downstream FEXT is pre-cancelled by a precoder in the DSLAM, while the upstream FEXT is cancelled by an upstream crosstalk canceller in the DSLAM. The recommendation provides a way to estimate the FEXT channel in both downstream and upstream and utilize the estimated channel to cancel the crosstalk.

A Disorderly Leaving Event, DLE, which may alternatively be denoted e.g. Disorderly Shutdown Event, DSE, on a DSL line occurs e.g. when a user unplugs the telephone cable or turns off the CPE abruptly. The disorderly shutdown of a DSL line may change the crosstalk channel characteristics, i.e. the crosstalk coupling to other lines, due to the impedance change at the CPE end which is disorderly shut down.

However, when using vectoring, the precoder in the DSLAM remains unchanged after a DLE and continues to be optimized for the original channel characteristics, i.e. the channel characteristics before the DLE. This could result in a significant SNR (Signal to Noise Ratio) drop for other lines, since the precoder is outdated and thus cannot completely cancel the crosstalk from the line which is disorderly shut down. A DLE on one line can make other lines retrain. In VDSL2, retraining a line may take 30 seconds, which is a considerable interruption, e.g. in IP-TV services. Even though the retrain time is significantly shorter in G.fast, it is still several seconds, which would still cause undesirable service interruption.

A method for handling DLEs is presented in [1], which is the work of two of the inventors of the present disclosure, and which is incorporated herein by reference. According to this method, a partial channel estimate is derived after the DLE, and is combined with a channel estimate derived before the DLE. That is, a part of the original channel estimate, in form of a channel coefficient matrix, is replaced with a new estimate, e.g. a column of the channel coefficient matrix. This method works very well for frequencies where the crosstalk between lines is within certain limits. However, when using higher frequencies for communication, such as in G.fast, the crosstalk between lines is larger, and thus all parts of the channel coefficient matrix are affected to a larger extent, even though the change in some parts may still be dominant. Measurements indicate that the impact of DLE is serious for frequencies around 30 MHz and beyond, which is of interest for G.fast.

Thus, there is a need for a fast method for estimating a channel, a channel tracking method, which works well also for higher frequencies.

SUMMARY

An object of the invention is to provide a fast channel tracking mechanism for handling Disorderly Leaving Events, DLEs in DSL systems.

According to a first aspect, a method is provided for handling DLEs causing Sudden Termination Change, STC, in a DSL system. The method comprises, when a DLE occurs on a line m in a vectored group of DSL lines, and the transmission on line m is, at least partly, continued: obtaining at least one error sample from CPEs connected to other lines in the vectored group of DSL lines, and calculating an estimate of the channel coefficients, H', changed due to the DLE. The estimate is calculated based on the at least one error sample, and thus a channel estimate is provided. The method further comprises modifying a downstream precoder, based on the channel estimate, such that retraining of the other lines in the vectored group due to the DLE is avoided, and errors are also minimized. The estimate of the channel coefficients is calculated based on the model $H'=H+C\Lambda H$.

According to a second aspect, a Vectoring Control Entity, VCE, is provided for handling DLEs causing Sudden Termination Change, STC, in a DSL system. The VCE is configured to: when a DLE occurs on a line m in a vectored group of DSL lines, and the transmission on line m is, at least partly, continued:
obtain at least one error sample from CPEs connected to other lines in the vectored group of DSL lines, and further to calculate an estimate of the channel coefficients, H', changed due to the DLE, based on the at least one error sample, thus providing a channel estimate. The VCE is further configured to modify a downstream precoder, based on the channel estimate, such that retraining of the other lines in the vectored group due to the DLE is avoided and errors are also minimized. The VCE is further configured to calculate the estimate of the channel coefficients based on the model $H'=H+C\Lambda H$.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
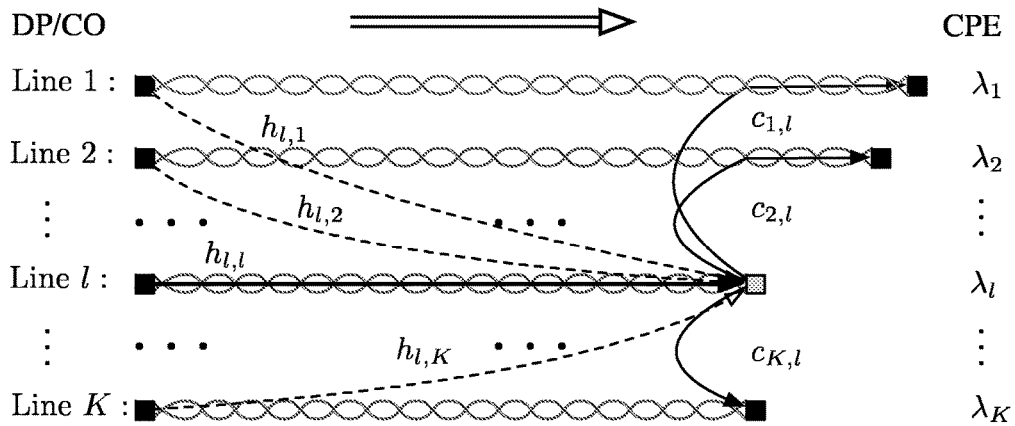
FIG. 1 shows a DS FEXT-reflected-NEXT model for OLE/DLE, where H(i,j) denotes the entry on the i-th row and j-th column of H. Same notation is used for C.

Briefly described, a solution is provided for enabling a fast update of the precoder for after a sudden impedance change on a line termination. A fast channel estimation method is provided to fast track the channel change and quickly update the precoder accordingly. The fast channel estimation, or tracking, method utilizes a new model for estimating the channel, and is applicable for all frequencies used for DSL communication, also for higher frequencies around 30 MHz and beyond.

The solution described herein relates in particular to emerging wideband communication systems over multi-pair copper cables, such as the recently drafted standard ITU-T G.fast [1]. In general, it is distinguished between sudden impedance changes, caused by lines inside a vectoring group, hereinafter referred to as disorderly leaving lines, and outside a vectoring group, hereinafter referred to as alien-line termination changes. This invention focuses on the former, i.e. disorderly leaving lines, especially when occurring on the CPE side.

Tracking the channel according to the standardized state-of-the-art way, i.e. relying solely on sync symbols and updating the entire channel matrix using the mechanisms described in the standard, causes far-end crosstalk (FEXT) for other users for a considerable amount of time, until the update is completed.

Modems that are suddenly, i.e. without prior warning or preemptive actions, turned off, change their operating mode, or are disconnected due to line disruption, cause sudden changes of the termination impedance, which they present to a multi-port wireline channel. In the prior art, such events are often referred to as Disorderly Leaving Events, DLEs or Disorderly Shutdown Event, DSE, as stated previously. These terms will also be used herein for denoting such events. Another term which may be used herein to denote such events is Sudden Termination Changes, STCs. Any change in the termination impedance on one or more of the channel's line(s) manifests itself as a change of a channel coefficient matrix. In general, a DLE alters all the coefficients of a channel matrix, and the changes increase with increasing frequencies. As previously mentioned, measurements indicate that the impact of DLE is serious for frequencies around 30 MHz and beyond.

Advanced wideband wireline communication systems employ signal coordination in order to mitigate crosstalk among lines. Corresponding techniques, referred to as vectoring, rely on accurate channel information. Sudden channel changes disturb the vectoring operation since a precoder, which was designed for the channel before the change, is no longer up to date. The mismatch may result in residual crosstalk causing a signal-to-noise ratio, SNR, drop that is beyond a reserved SNR margin and makes active end users suffer from packet errors and losses.

An exemplifying procedure according to an embodiment of the herein disclosed solution will be described below as comprising three parts, where at least b is optionally performed in order to reduce interference to other lines in a vectored group.

a) A DLE at the CPE side is detected by a power detector. Particularly if a CPE is unplugged in a DLE, the received power in upstream will go down to zero. In this case, a loss of signal will be detected. In a TDD system like G.fast, if a DLE happens at the CPE side during an upstream, US, slot, it may be detected in the same slot and counter measures (described in b) below) can be taken in the following downstream, DS, slot. If an STC happens during a DS slot, it may be detected in the next US slot and counter measures can be taken in the following DS slot. In a FDD system like VDSL2, the detection process starts as it happens.

b) As soon as a DLE has been detected, the DS data signal intended to the disorderly leaving line i may be replaced by zeroes. That is, during data symbol slots, zeroes are transmitted. The precoder then generates a low-power "anti-crosstalk" signal that cancels the FEXT at the CPE port. In this case, on the disorderly leaving line, the direct signal intended to its own CPE is gone. On each victim line, the precompensated signal associated with the direct signal of the disorderly leaving line is also gone, while the precompensated signals associated with the direct signal of all other victim lines are kept unchanged. Based on the FRN-model, which will be described below, there is no signal entering the port, thus there is no signal to be reflected and subsequently coupled via NEXT to the other ports—the other lines remain undisturbed during DS transmission. An alternative to sending zeroes is sending the DS data signal intended to the disorderly leaving line in a sufficiently low power.

c) During synch-symbol slots, regular synch symbols, and not zeroes as in the data symbol slots, are transmitted, and a specific channel estimation scheme is employed. The scheme, which will be described below is based on the FRN model and reduces the complexity from estimating $(K-1) \times K$ channel coefficients, i.e. all changed coefficients, needed by the state-of-the-art approach to only $K-1$ reflection coupling coefficients, in order to track all changed coefficients.

In step b), it has been realized by the inventors that it is advantageous to set the gain scaling factor of the leaving line to zero during the data symbols and other non-sync symbols after the detection of a DLE, or loss of signal on the line, while keeping the precoder coefficients unchanged, especially the coefficients on the columns associated with the victim lines. On the disorderly leaving line, only the direct signal intended to its own CPE is muted, while the precompensated signal from other lines to the disorderly leaving line is kept. On other lines, we keep transmitting both direct signals and the precompensated signals among these victim lines. Therefore, this operation does not stop the transmission on the leaving line completely. If the line is completely stopped, no signal would be present on the leaving line and the precompensated signal component from other lines to the leaving line would also disappear. Basically, the signals associated with the data symbols intended to the leaving line CPE are disappeared on all lines. It should be noted that data symbols here may include all non-sync symbols, if other symbols are also needed to be protected. In this document, we show mathematically and also experimentally via simulations that when using the suggested solution, there will be no residual crosstalk due to the mismatch of the outdated precoder and the changed channel. Note that in this step, the precoder is kept unchanged. At a DLE, the crosstalk channel changes are due to the reflected signals from the disconnected port of the leaving line to other lines. By keeping the original precoder, at least of the coefficients associated with the victim lines, no crosstalk signals from the victim lines will arrive at the disconnected port and thereby no crosstalk will be reflected. And the signal of the disorderly leaving line is also muted. No crosstalk is caused by the leaving line either. Therefore, no residual crosstalk will be present in the system.

Although the method of muting the direct signal of the leaving line described above takes away the residual crosstalk at the CPE end, it may cause unnecessary erasures, i.e. errors, on the leaving line in the case of a false detection of a DLE. If step b above is not performed, and regular transmission is continued and step c is performed directly, the fast tracking algorithm is very robust with false detections. However, step b is easy to implement and also relax the time requirement for the fast tracking implementation. With step b, step c can gain more time for the algorithm execution while not causing errors and therefore reduce the hardware complexity for fast tracking. As previously stated, the muting method is advantageous but optional. An alternative to the muting method/step b) is to continue the transmission on the leaving line as before the DLE. As explained above, the solution described herein would still be applicable. Note that during the transmission of sync symbols, the gain scaling factor of the leaving line is not set to zero. So, when applying an exemplifying embodiment comprising the muting method, the gain scaling factor may alternate between zero, or close to zero, and the original value during data symbols and sync symbols, respectively. In other words, during transmission of sync symbols, the gain scaling factor is equal to, or at least in parity with, the gain scaling factor used for transmission before the DLE; and during transmission in data symbol positions after the DLE, the gain scaling factor is set to zero, or at least close to zero. In principle, during sync symbols, gain scaling can be set to any non-zero number. When the non-zero number is known by the VCE/CO, the channel estimation can be resolved. However, using original value is of interest of practical implementation.

In order to update the precoder to match the channel after the DLE, it is necessary to track the channel change. The precoding coefficients of the other lines, i.e. lines other than the leaving line, should be updated such that residual crosstalk is cancelled by the (updated) precoder when the transmission on the leaving line has been completely stopped. In this invention, the crosstalk channel change is modeled as the reflected crosstalk from the leaving line. Based on this model, a fast channel estimation method is proposed to estimate only the modeled reflected crosstalk coefficients, which are modeled as a vector with the elements of the number of other lines. The estimated elements of the vector are much fewer than that of a matrix. Thus, the channel change can be estimated with only one error sample report corresponding to one sync symbol, which is much faster than for a prior art conventional channel estimation scheme. For example, for 10 lines, a normal conventional channel estimation scheme needs the error samples of 16 sync symbols. Thus, the invented method is potentially much faster.

Method in a Vectoring Control Entity, VCE.

Below, examples of embodiments of a method performed by a VCE will be described with reference to FIGS. 3-4. The method is suitable for handling DLE causing STC in a DSL system. The VCE is a function block which is operable to provide vectoring for a group of lines in a DSL system. Physically, the VCE may be; be comprised in Central Office, CO, or Distribution Point, DP. The VCE may be comprised in a DSLAM, connectable to wirelines in the DSL system. Usually, for a small system with a small number of lines, VCE is integrated in to a DSLAM. Alternatively, the VCE may be comprised in a node outside a DSLAM, which is often the case when the system is large and the VCE needs to coordinate multiple DSLAMs.

Figure 3:
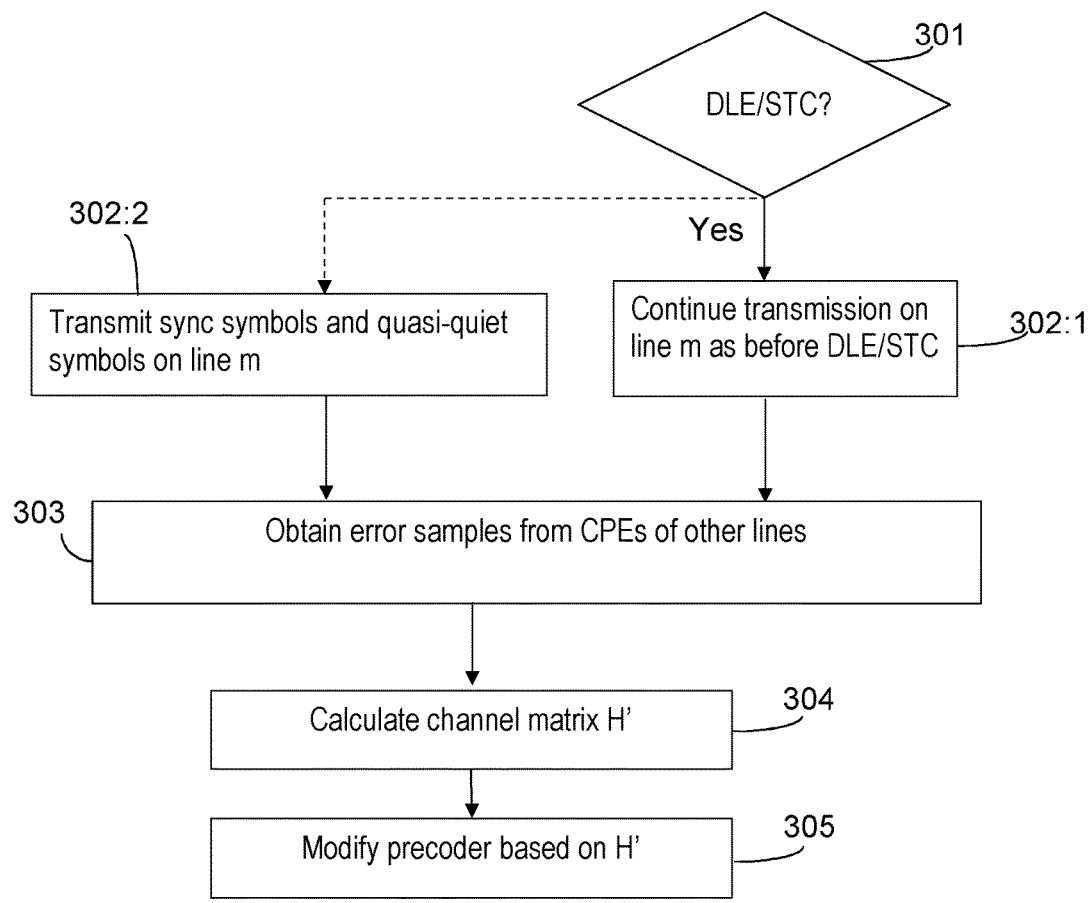
FIGS. 3-4 illustrate procedures performed by a VCE/DP/CO, according to exemplifying embodiments.
Figure 4:
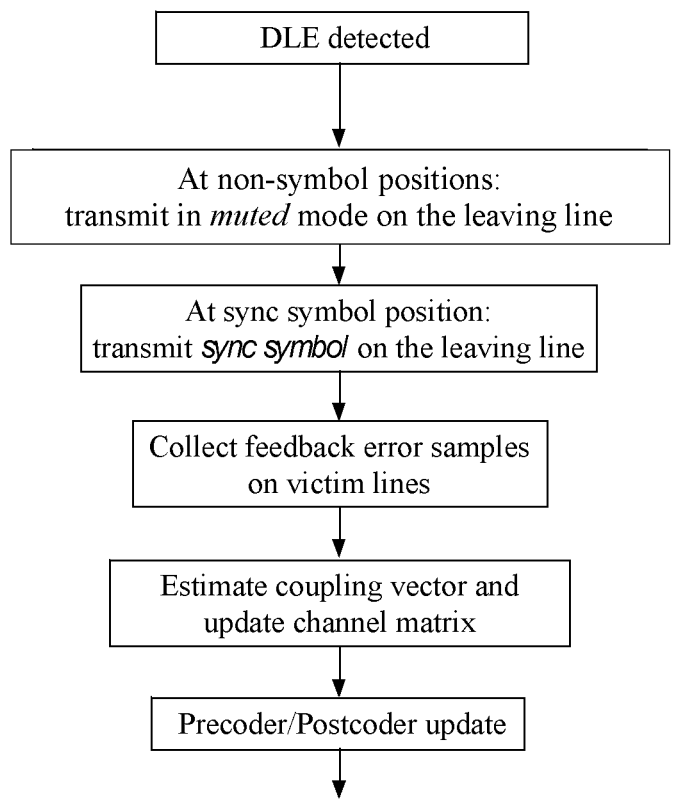

A method performed by a VCE is illustrated in FIG. 3. The network node determines 301 whether a DLE has occurred on a line in a vectored group of DSL lines. When a DLE occurs on a line m, at least one error sample is obtained 303 from Customer Premises Equipments, CPEs, connected to other lines in the vectored group of DSL lines. The transmission on line m, which may also be denoted e.g. the leaving line, is at least partly continued after the DLE, which will be further described below. Further, an estimate is calculated 304, of the channel coefficients, H', changed due to the DLE. The estimate is calculated based on the obtained at least one error sample, thus providing a channel estimate. The method further comprises modifying 305 a downstream precoder, based on the channel estimate. The estimate of the channel coefficients is calculated based on the model H'=H+CΛH, where C is a near-end crosstalk coupling matrix for the CPE end of the vectored group;

Λ is a diagonal matrix with the reflection coefficients, after the DLE, of the CPE-end of the cables associated with the vectored group;

H is a matrix with the channel coefficients before the DLE; and

H' is a matrix with the estimated channel coefficients after the DLE.

By performing the actions described above, retraining of the other lines in the vectored group due to the DLE on line m may be avoided, and errors are also minimized, which is very advantageous.

The error samples may be obtained by transmitting an error feedback request to the CPEs connected to the other lines in the vectored group. By "other lines" is here meant "other than line m". That is, the error samples may be received from the CPEs in response to such error feedback requests. Such requests may be transmitted to the CPEs over a robust management channel. In VDSL2, it is called robust embedded operations channel, ROC. In G.fast, it is called the Robust Management Channel (RMC). Such requests can also be transmitted to the CPEs over the embedded operations channel (eoc) without robustness enhancement.

Regarding the continued transmission on line m after the DLE, there are a few alternatives, of which two different are illustrated in FIG. 3. In one embodiment, the transmission is continued 302:1 on line m after the DLE just as it was before the DLE. That is, the transmission on line m is not changed in response to the detection of a DLE on line m. In another embodiment, the transmission on line m may be changed 302:2 in response to the DLE, in order to mitigate the interference subjected to the other lines during the channel tracking procedure. For example, in an embodiment comprising the alternative 302:2, the transmission of sync signals in sync symbol positions could be continued but the transmission of the direct signal in line m in data symbol positions on line m could be muted, e.g. by setting a gain value to zero, which will be further described below. Other alternatives for the continued transmission are also possible, and considered to be encompassed by the present disclosure.

It should be noted that at a Disorderly Leaving Event, DLE, which is the case that is discussed herein (as opposed to orderly leaving event, OLE), there are two problems that arises related to the channel matrix. First, the channel matrix is fully changed, at least in certain frequency ranges, as a consequence of the DLE; and second, the channel matrix dimension is reduced, since a line is leaving. It should further be noted that it is fully possible that more than one line is subjected to an DLE. In the examples herein, in order to facilitate understanding, it is, however, assumed that only one line at a time exhibits an STC of a DLE.

As stated above, according to the invention, the change in the channel matrix is modeled as Δ=CΛH. If assuming three lines, the channel matrix will be of the dimension 3×3, and could be denoted $H_3$. The channel, or channel matrix, could then be described, after the DLE, as $H_{3,DLE}=H_3+\Delta_3$, where $\Delta_3$ is the change.

$$\Delta_3 = C\Lambda H_3 = \begin{bmatrix} 0 & c_{12} & c_{13} \\ c_{21} & 0 & c_{23} \\ c_{31} & c_{32} & 0 \end{bmatrix} \begin{bmatrix} 0 & 0 & 0 \\ 0 & 0 & 0 \\ 0 & 0 & \lambda_3 \end{bmatrix} H_3$$

C being a near-end crosstalk coupling matrix for the CPE end of the vectored group, as previously mentioned. The coefficients in this matrix are changed after the DLE, and are thus unknown when initiating the fast channel tracking described herein. $\Lambda$ is a diagonal matrix with the reflection coefficients, after the STC, of the CPE-end of the cables associated with the vectored group, as previously mentioned. It is assumed here that all CPEs, except for the one subjected to a DLE, are perfectly matched to the lines. In this example with three lines, let line 3 be the leaving line. This means that there will be no reflection for lines 1 and 2, since the CPE impedance, alt. termination, is perfectly matched. Thus the reflection coefficients, on the diagonal of $\Lambda$, are zero for lines 1 and 2. However, for line 3, the DLE entails that the termination is no longer matched, and thus the reflection coefficient will not be zero, i.e. $\lambda_3 \neq 0$. For example, if $\lambda_3 = 1$, the signal arrived at the disconnected port will be fully reflected back. Performing the matrix multiplication will give:

$$\Delta_3 = C\Lambda H_3 = \begin{bmatrix} 0 & 0 & c_{13}\lambda_3 \\ 0 & 0 & c_{23}\lambda_3 \\ 0 & 0 & 0 \end{bmatrix}$$

$$H_3 = \begin{bmatrix} c_{13}\lambda_3 h_{31} & c_{13}\lambda_3 h_{32} & c_{13}\lambda_3 h_{33} \\ c_{23}\lambda_3 h_{31} & c_{23}\lambda_3 h_{32} & c_{23}\lambda_3 h_{33} \\ 0 & 0 & 0 \end{bmatrix} = \begin{bmatrix} c_{13}\lambda_3 \\ c_{23}\lambda_3 \end{bmatrix} [h_{31} \ h_{32} \ h_{33}]$$

Above, it is seen that 6 channel coefficients have been changed in the channel matrix. In a normal tracking method, all these 6 coefficients need to be estimated. In our fast tracking method, a combined reflection coupling coefficient from port j to port i is defined as $c_{ij}\lambda_j$, following the model above, to estimate the channel change $\Delta_3$. Thus, in this example, only two reflection coupling coefficients need to be estimated, i.e. $c_{13}\lambda_3$ and $c_{23}\lambda_3$, since the original channel vector $[h_{31} \ h_{32} \ h_{33}]$ can be known, either stored in the memory or derived from the original precoder. These two reflection coupling coefficients can be derived from error samples obtained on lines 1 and 2 after the STC. Could alternatively be expressed as after the DLE. Since there are only two unknowns to solve in the equation system above, only one error sample from line 1 and line 2, respectively, will be needed to solve the equations. Then, the precoder can be updated accordingly to adapt to the channel change. Thus, the herein described fast tracking method is potentially much faster than a normal tracking scheme.

When the fast channel tracking is performed, the transmission on line 3 will eventually be stopped. The channel matrix will then have a reduced dimension, i.e. 2×2 in this example. Denoting the 2×2 channel matrix after DLE $H_{2,DLE}$:

$$H_{2,DLE} = H_2 + \Delta_2 = H_2 + \begin{bmatrix} c_{13}\lambda_3 h_{31} & c_{13}\lambda_3 h_{32} \\ c_{23}\lambda_3 h_{31} & c_{23}\lambda_3 h_{32} \end{bmatrix} = H_2 + \begin{bmatrix} c_{13}\lambda_3 \\ c_{23}\lambda_3 \end{bmatrix} [h_{31} \ h_{32}]$$

Where $H_2$ is a part of the original matrix $H_3$, i.e. the channel matrix for the three lines before the DLE. Here, there are two cases depending on if step b is implemented or not.

If step b is not implemented, the precoder may first be updated by fast tracking to adapte to the change while the leaving line, i.e. line 3, keeps transmitting until it is believed to have left. Then, the transmission on the leaving line may be completely stopped. The channel matrix then becomes smaller as $H_{2,DLE}$. In this case, the precoder needs to be further updated since an inverse of $H_{2,DLE}$ does not equal to the corresponding 2×2 submatrix of inverse of $H_{3,DLE}$. In this case, one can reuse the already stored channel estimation from the fast tracking process to update the precoder again. Or one can apply fast tracking algorithm again to estimate $H_{2,DLE}$ and then update the precoder.

If step b is implemented, the leaving line transmits the muted signal on data symbol slots and regular sync symbols on sync symbols slots. It may continue do this until it is believed left already. During this time, the fast tracking algorithm may be applied to estimate the channel and calculate the precoder accordingly for the reduced 2-lines system, i.e. only line 1 and line 2. Then the leaving line stops its transmission totally while the precoder is updated with the calculated precoder coefficients simultaneously.

The transmission in data symbol positions on other lines than line m, before the DLE, comprises far-end crosstalk precompensation signals, including the precompensated signal from line m, and a direct signal of its own. After the DLE, the far-end crosstalk precompensation signal from line m may be stopped on the other lines, while the other signals are continued after the DLE, such that the reflection of cross-talk from the precomensated signal from line m on other lines become zero. In other words, the respective signals which precompensate cross-talk from line m on the other lines before the DLE, may be stopped after the DLE, when there is no cross-talk from line m if the direct signal of line m is stopped when step b is performed. As an alternative to stopping the respective precompensated signal from line m on the other lines, this signal could be reduced in power after the DLE, as compared to the power of the signal before the DLE. Herein, a "precompensated signal from line m" is a signal which precompensates for crosstalk from line m. This signal may be generated by the precoder based on the direct signal on line m.

Below, an exemplifying procedure according to an embodiment of the herein disclosed solution will be described in more detail.

Consider a vectoring system with K lines, or users. For simplicity, analysis is performed on a certain sub-carrier and at a certain time instant. Signal transceiving in frequency-domain in downstream, DS, direction can be described independently as y=Hx+n, where the transmit and receive signal are $x \in \mathbb{C}^{K \times 1}$ and $y \in \mathbb{C}^{K \times 1}$ respectively; the channel matrix seen by the vectored group is $H \in \mathbb{C}^{K \times K}$, and additive background noise on the copper pairs is $n \in \mathbb{C}^{K \times 1}$. The direct channel of each line locates on the diagonal of H, whereas the FEXT composes its off-diagonal entries.

Vectoring enables the cooperative signal processing within the vectored group by configuring an appropriate precoder for the downstream and a crosstalk canceller, in upstream at the DP/CO to cancel FEXT. Specifically in DS, let $G \in \mathbb{R}^{K \times K}$ denote a diagonal matrix with the gain adjuster, i.e. gain scaling factor as stated before, for each line on the main diagonal, namely $G=\text{diag}([g_1, g_2, \ldots, g_K])$. After including precoding, $P_0$, the transmitting of x at DP/CO yields $y=H P_o G x+n$. An ideal precoder neutralizes crosstalk effectively such that for the input symbol x, $$\Sigma x = H P_o G x \qquad (1)$$

where $\Sigma$ is a K×K diagonal matrix.

A DLE at the CPE side exhibits STC and changes the whole channel coupling environment. Equivalently, every entry of the matrix H changes. Before further processed, the outdated precoder $P_o$ fails at anti-crosstalk and makes all receiving ends suffer from residual crosstalk.

By modeling the changed coupling condition with near-ends coupling coefficients, the estimation effort reduces from (K−1)×K parameters to K−1. Fast estimation and adaption may further be supported by controlling the transmitted signal on the leaving line.

Specifically, let $\Lambda \in \mathbb{C}^{K \times K}$ denote a diagonal matrix with the reflection coefficients of the CPEs, or rather of the CPE end of the cables in the vectored group, on the main diagonal, i.e. $\Lambda = \text{diag}([\lambda_1, \lambda_2, \ldots, \lambda_K])$. The near-end coupling matrix $C \in \mathbb{C}^{K \times K}$ describes the NEXT or attenuated NEXT at the CPE end, depending on the relative cable length, which is also illustrated in FIG. 1 for the I-th column of C. When the terminations at the CPEs are perfectly matched, there will be no reflection, which gives the reflection coefficients $\lambda_i = 0$, (i=1, . . . , K) ideally. Then, the CPE-near-end coupling matrix C has no contribution on the whole coupling environment.

After a DLE, when the termination of one line in a vectored group has changed and is mismatched, one diagonal element of $\Lambda$ will deviate significantly from 0. Assume line no. I exhibits an STC, which is quantified by that the reflection coefficient $\lambda_I \neq 0$. In this case, $\xi = \Lambda y = \Lambda H P_o G x$ is reflected by mismatched CPE termination. The reflected signal $\xi$ couples back to the CPEs via C, and adds $$\delta = C \Lambda H P_o G x \qquad (2)'$$

to the expected receive signal y. So the received signal after DLE becomes $$\begin{aligned} y' &= y + \delta \qquad (3)\\ &= H P_o G x + C \Lambda H P_o G x + n \\ &= (I + C \Lambda) H P_o G x + n \\ &= (H + \Delta) P_o G x + n \end{aligned}$$

Equivalently, the channel changes from H to $H' = H + \Delta$, where $\Delta = C \Lambda H$.

A near-optimal linear precoder has been proposed in the prior art as $P_o = \mu H^{-1} H_\Sigma$, where the diagonal matrix $H_\Sigma = \text{diag}(\text{diag}(H))$ is the diagonal matrix of H and the scaling factor $$\mu = \max_i \|[H^{-1} H_\Sigma]_{row\ i}\|.$$

For example, assume K=3 and I=2. The mismatched error in Eq.(2) is actually $$\delta = \mu C \Lambda H H^{-1} H_\Sigma G x$$

$$= \mu \begin{bmatrix} c_{1,1} & c_{1,2} & c_{1,3} \\ c_{2,1} & c_{2,2} & c_{2,3} \\ c_{3,1} & c_{3,2} & c_{3,3} \end{bmatrix} \begin{bmatrix} 0 & 0 & 0 \\ 0 & \lambda_2 & 0 \\ 0 & 0 & 0 \end{bmatrix} H_\Sigma G x$$

$$= \mu \begin{bmatrix} 0 & \lambda_2 c_{1,2} & 0 \\ 0 & \lambda_2 c_{2,2} & 0 \\ 0 & \lambda_2 c_{3,2} & 0 \end{bmatrix} \begin{bmatrix} h_{1,1} g_1 & 0 & 0 \\ 0 & h_{2,2} g_2 & 0 \\ 0 & 0 & h_{3,3} g_3 \end{bmatrix} \begin{bmatrix} x_1 \\ x_2 \\ x_3 \end{bmatrix}$$

$$= \mu \begin{bmatrix} 0 & \lambda_2 c_{1,2} & 0 \\ 0 & \lambda_2 c_{2,2} & 0 \\ 0 & \lambda_2 c_{3,2} & 0 \end{bmatrix} \begin{bmatrix} h_{1,1} g_1 x_1 \\ h_{2,2} g_2 x_2 \\ h_{3,3} g_3 x_3 \end{bmatrix}$$

$$= \mu \lambda_2 \begin{bmatrix} c_{1,2} \\ c_{2,2} \\ c_{3,2} \end{bmatrix} h_{2,2} g_2 x_2.$$

The above implies that, in the general case, the mismatched error can be written as:

$$\delta = v_I \mu h_{I,I} g_I x_I, \qquad (4)$$

where $v_I = \lambda_I [c_{1,I}, \ldots, c_{2,I}, \ldots, c_{K,I}]^T$.

The equation above reveals, and the inventors have realized, that the activating source of mismatched error $\delta$ only comes from the transmit signal $x_I$ on the leaving line via the I-th direct channel $h_{I,I}$ (see solid line in line I in FIG. 1), which is then reflected and couples to CPE receivers via $v_I$, the reflection coupling vector of line I.

With the mismatched errors' source and paths targeted, we propose an operation as follows to accomplish changed channel estimation and precoder update while minimizing the disturbance to active end users.

Figure 2:
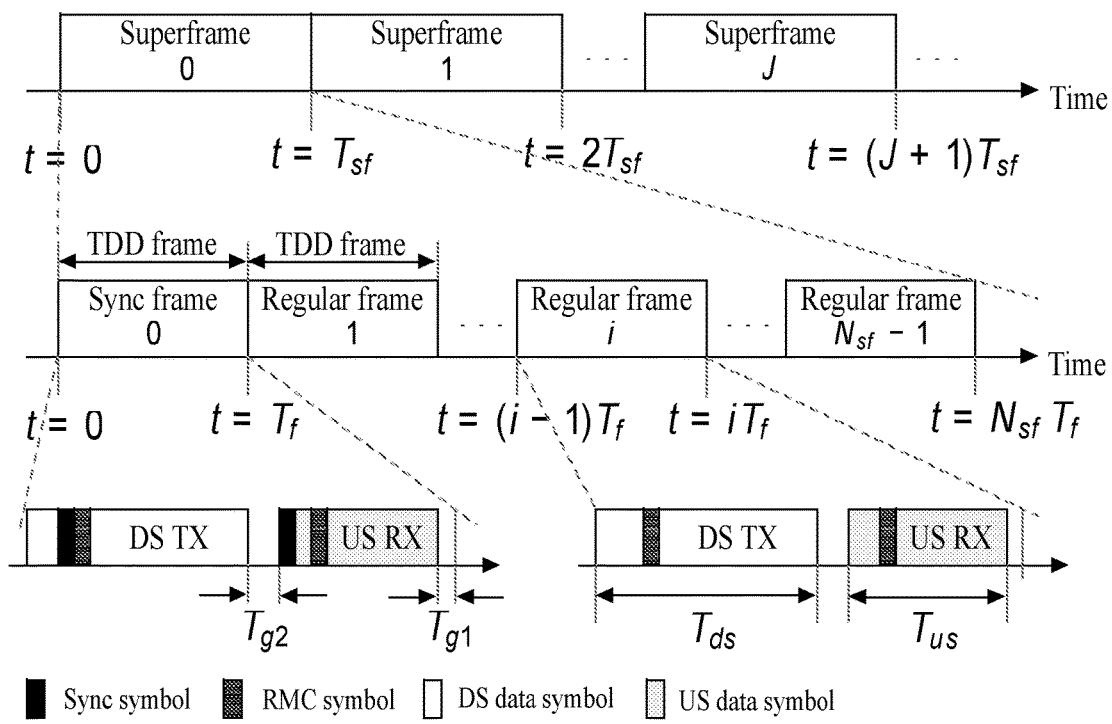
FIG. 2 illustrates G.fast TDD structure at VCE/DP/CO

A reference time-line for G.fast TDD frames is shown in FIG. 2. A typical TDD frame duration is $T_f = 750$ µs, corresponding to $N_f = 36$ symbol periods ($T_s$). Time gaps are reserved between paired DS and US as $T_{g2}$, and between US and next DS as $T_{g1}$. The number of TDD frames in one superframe, binding to $N_f = 36$, is $N_{sf} = 8$. The first frame of each superframe is specified as sync frame, which contains one sync symbol locating on predefined symbol position in both directions. The sync frame is then followed by 7 regular frames.

Consider a DLE at time instant $t_I$ at a CPE connected to line I during the first superframe in FIG. 2, i.e. $t_I \in [0, T_{sf}]$. If the DLE occurs during a DS transmission interval of the i-th TDD frame ($t_I \in [(i-1)T_f, (i-1)T_f + T_{ds}]$), the VCE/DP/CO will be notified about the event during next US transmission period ($t \in [(i-1)T_f + T_{ds} + T_{g2}, iT_f - T_{g1}]$). In the next DS transmission period and onwards ($t \geq i T_f$), the VCE/DP/CO may transmit the muted signal on data symbol positions by controlling the gain adjuster $g_i$ on the leaving line. The detailed illustration for this special operation will be given below. If a DLE occurs during an US transmission interval, the "muting" for DS may launch directly, if step b is implemented.

According to current standard, the transmission on the leaving line is turned off immediately when a DLE is detected. However, according to the solution disclosed herein, the precoder is kept "outdated" as $P_o$ until estimation is completed if step b is implemented. That is, the precoder, which is optimized for the channel as it was before the DLE, is kept also after the DLE, even though it then is outdated. The DS operation for new channel estimation, or "fast tracking", may be accomplished by sending two kinds of special symbols: muted symbol and sync symbol. An exemplifying embodiment is illustrated in FIG. 4.

Specifically, by modifying the I-th gain adjuster to be $\hat{g}_I = \epsilon (\epsilon \rightarrow 0)$ at the data symbol positions, symbols are transmitted in what herein is denoted muting mode, i.e. muted symbols are transmitted at non-sync symbol positions on the leaving line. The mismatched error $\delta$ in Eq.(4) adding on the victim lines becomes negligible as $\delta=v_l\mu\epsilon x_l\to 0$ (for $\epsilon\to 0$). This enables the whole process to be "silent" to active end users. Muted symbols can also be obtained by change the symbol constellation points to zeros or close to zeros in the QAM symbol encoder/mapper.

NOTE: in the G.fast standard, idle symbols are defined as: "10.2.1.7 Idle Symbol Encoding For all sub-carriers of an idle symbol the symbol encoder shall generate a constellation point Xi=0, Yi=0.

If precoding in enabled, transmission of an idle symbol may result in non-zero power at the U interface due to adding of FEXT pre-compensation signals from $\epsilon(k,n)$ reference point (see FIG. 10-1).

If precoding is disabled, transmission of idle symbol results in zero power at the U interface. Therefore, in upstream direction transmission of idle symbol results in a quiet symbol period."

The idle symbols are equivalent to the muted symbols here if set the gain scaling factor to zero or set the symbol constellation points to zero. Here, the expression muted symbols is considered to also cover the alternative option of continuing to transmit the symbols, but at a very low power.

Sync symbols are transmitted every 6 ms, i.e. one superframe duration, on each line in G.fast (cf. FIG. 2). Assume that J superframes are required before the update is completed. Let $t_j^{sc}$ be the time instant to transmit the j-th DS sync symbol. On this specific time slot, the l-th gain adjuster is set back to $g_l$, which may be stored e.g. in the bits-and-gains table assigned during initialization. A Sync vector $s(t_j^{sc})=[s_1(t_j^{sc}), s_2(t_j^{sc}), \ldots, s_l(t_j^{sc}), \ldots, s_K(t_j^{sc})]^T$ is transmitted from DP/CO to CPEs. Accordingly, the received sync vector at CPE-end presents as $$q(t_j^{sc}) = \mu H_\Sigma G s(t_j^{sc}) + v_l\mu h_{l,j} g_l s_l(t_j^{sc}) + n \quad (5)$$
$$= \mu H_\Sigma G(s(t_j^{sc}) + e(t_j^{sc})),$$

assigning $e(t_j^{sc})=G^{-1}H_\Sigma^{-1}(v_l\mu h_{l,l}g_l s_l(t_j^{sc})+n)/\mu$. The error samples of sync symbols $e(t_j^{sc})$ on victim lines are then fed back to DP/CO.

After sending the sync symbol on scheduled time instants, the transmission on line l goes back to quasi-quiet symbols for all data symbol positions. The transmitter may keep on alternatively sending quasi-quiet symbols and sync symbols on the disorderly leaving line until DP/CO have collected a reasonable number of $e(t_j^{sc})$ to do an elegant coupling vector estimation. Stack the error vectors collected without the I-th elements as:

$$E = I_{K\setminus l}^{[r]}[e(t_1^{sc}), e(t_2^{sc}), \square, e(t_J^{sc})] \quad (6)$$
$$I_{K\setminus l}^{[r]} G^{-1} H_\Sigma^{-1} v_l h_{l,l} g_l s_l^T + N,$$

where $I_{K\setminus l}^{[r]}$ is an K-dimension identity matrix excluding the l-th row,
$s_l(t_j^{sc})=[s_l(t_1^{sc}), s_l(t_2^{sc}), \ldots, s_l(t_J^{sc})]^T$ is the sync sequence transmitted on line l at $t_j^{sc}$, (j=1, \ldots, J), and $N\in\mathbb{C}^{(K-1)\times J}$ is the equalized additive noise on victim lines for J sync time instants. By "victim lines" is meant the other lines in a vectored group except the disorderly leaving line. The estimation of $v_l$ can be done by $$\hat{v}_l = \frac{\mathcal{M}_l\{H_\Sigma G\}E(s_l^H s_l)^{-1}s_l^H}{\mu h_{l,l}}, \hat{v}_l \in \mathbb{C}^{(K-1)\times 1}, \quad (7)$$

where $\mathcal{M}_{l,i}\{\cdot\}$ is a dimension reducing function by excluding the i-th column and row.

When the coupling vector $v_l$ is estimated and the whole channel matrix change is derived accordingly, the DP (or CO) may update the precoder based on the channel matrix change and may shut down the transmission on the leaving line completely.

It should be noted that the same scheme as presented above works and may be applied also for the non-linear Tomlinsen Harashima precoder, which will be used in G.fast phase 2 supporting up to 212 MHz in frequency.

The fast channel estimation described herein is different from the one described in [1]. With a deeper understanding regarding the mechanism what exactly causes the channel change, the new method explicitly estimates the reflected crosstalk coefficients which cause the channel changes and then calculate the channel change. This is especially important in high frequencies for G.fast use, where the whole channel matrix changes due to a DLE. The previous method described in [1] actually is an approximate of the new method described herein. In low frequencies, the changes in other columns are much smaller than the column associated with the leaving line. Thus, for certain frequencies, e.g. VDSL2 frequency range, the method in [1] works sufficiently well by estimating the dominant column changed and neglecting other columns. However, the changes in other columns get closer in magnitude to the column associated with the leaving line in higher frequency, where the crosstalk level gets closer to the direct channel. In other words, the dominance of the leaving column decreases over frequencies. Therefore, the performance of the pervious method described in [1] degrades over frequencies. The new method significantly improves the previous method in higher frequencies, and is a complete solution, which covers both low and high frequencies.

Hardware Implementations

Figure 5:
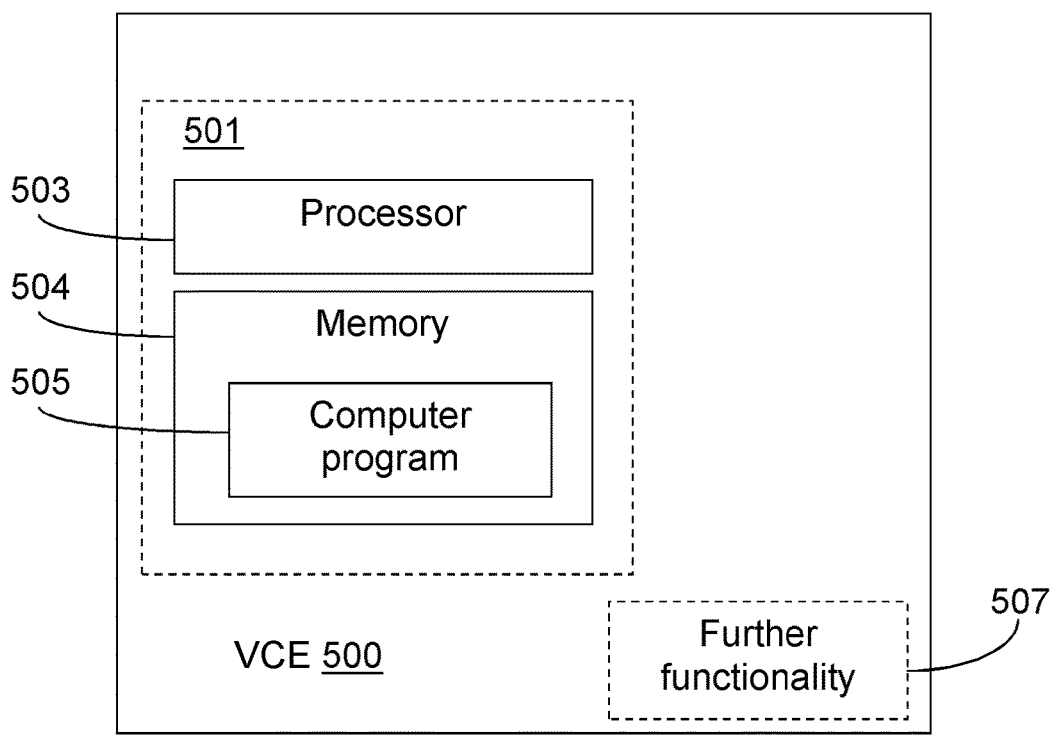
FIGS. 5-6 show a VCE/DP/CO according to exemplifying embodiments

The techniques and processes described above can be implemented in a network node which is operable to provide vectoring for a group of lines in a DSL system. As previously mentioned, the node may be denoted Vectoring Control Entity, VCE, and may be comprised in a CO or a DP. FIG. 5 is a schematic illustration of an exemplifying embodiment of a VCE 500 in which a method embodying any of the presently described techniques can be implemented. A computer program for controlling the VCE 500 to carry out a method embodying the present invention is stored in a program storage 504, which comprises one or several memory devices. Data used during the performance of a method embodying the present invention may also be stored in the program storage 504, or a separate data storage, which also may comprise one or more memory devices. During performance of a method embodying the present invention, instructions 505, such as program steps may be fetched from the program storage 504 and be executed by processing means 503, such as a Central Processing Unit, CPU, or other processor. Output information resulting from performance of a method embodying the present invention can be stored back in a data storage, or, be sent to an Input/Output (I/O) interface, which includes a network interface for sending and receiving data to and from other network nodes and which may also include a radio transceiver for communicating with one or more terminals. The VCE 500 is associated with the same technical features, objects and advantages as the previously described method embodiments. The VCE is described in brief in order to avoid unnecessary repetition.

The part of the network node 500 which is most affected by the adaptation to the herein described solution is illustrated as an arrangement 501, surrounded by a dashed line. The further functionality 506 illustrated in FIG. 5 may be assumed to carry out regular VCE and/or node functions.

Thus, when an DLE occurs on a line m in a vectored group of DSL lines, and the transmission on line m is, at least partly, continued, the execution of the instructions 505 by the processing means 503 causes the VCE 500 to obtain at least one error sample from CPEs connected to other lines in the vectored group of DSL lines, and to calculate an estimate of the channel coefficients, H', changed due to the DLE, based on the at least one error sample. The execution of the instructions further causes the VCE to modify a downstream precoder, based on the channel estimate. The estimate of the channel coefficients is calculated based on the model $H'=H+C\Lambda H$, as previously described in detail.

The execution of the instructions may further cause the VCE to configured to continue the transmission of sync symbols on line m after the DLE. As previously described, the transmission in data symbol positions on line m before the DLE comprises a far-end crosstalk precompensation signal and a direct signal. The execution of the instructions may cause the VCE to continue the transmission of the far-end crosstalk precompensation signal after the DLE, and further to transmit the direct signal on line m with reduced power after the DLE, as compared to before the DLE.

The execution of the instructions may further cause the VCE to obtain at least one error sample from the CPE of at least one other line in the vectored group, and further to send at least one error feedback request over the embedded operations channel (eoc) in both VDSL2 and G.fast or over a robust embedded operations channel, ROC, in VDSL2, or over a robust management channel, RMC, in G.fast, in order to collect one or more error samples.

Figure 6:
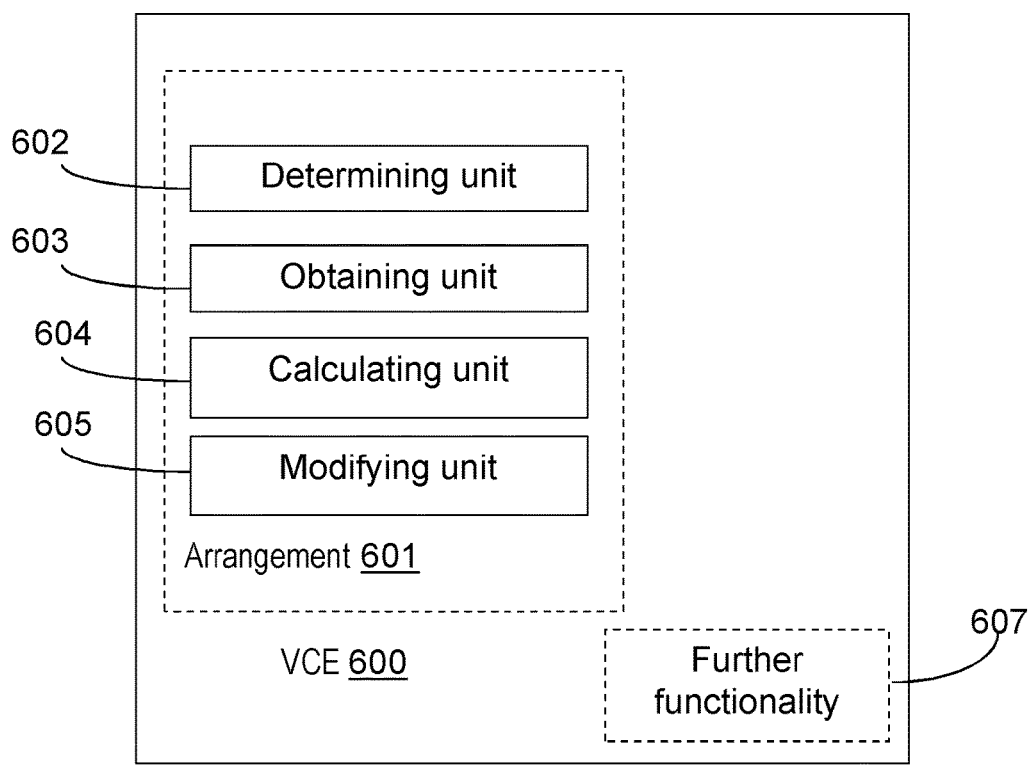

An alternative implementation of the network node 500 is shown in FIG. 6. The VCE 600 or arrangement 601 comprises an obtaining unit 602, configured to obtain at least one error sample from CPEs connected to other lines in the vectored group of DSL lines. The VCE 600 further comprises a calculating unit 604, configured to calculate an estimate of the channel coefficients, H', changed due to the DLE, based on the at least one error sample, thus providing a channel estimate. The VCE 600 further comprises a modifying unit 605, configured to modify a downstream precoder, based on the channel estimate. The arrangement 601 could further comprise a determining or detecting unit 602, configured to detect the occurrence of an DLE on a line in the vectored group. Alternatively, this detection could be regarded as a part of the standard functionality 607.

The VCE described above could comprise further units or modules configured for the different method embodiments described herein.

The units or modules in the arrangements in the respective different network node embodiments and wireless device embodiments described above could be implemented e.g. by one or more of: a processor or a microprocessor and adequate software and memory for storing thereof, a Programmable Logic Device (PLD) or other electronic component(s) or processing circuitry configured to perform the actions described above, and illustrated e.g. in FIGS. 5-10. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC. The VCE could be implemented as a computer program, e.g. a software module, which is run on a node which is operable to communicate with and/or control at least parts of the DLE system. Such a node may be located locally, near the DSL lines, or remote, such as in a distributed system, e.g. a cloud solution.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments.

ABBREVIATIONS

CO Central Office
CPE Customer premises equipment

DLE Disorderly leaving event
DSL Digital Subscriber Line
DSLAM Digital Subscriber Line Access Multiplexer
DP Distribution point
FEXT Far-end crosstalk
FRN FEXT-reflection-NEXT
OLE Orderly leaving event
NEXT Near-end crosstalk
ROC Robust embedded Operations Channel
STC Sudden termination change
TDD Time-division duplexing
VCE Vectoring Control Entity
VDSL Very high speed digital subscriber line

REFERENCES

[1] C. Lu, and P.-E. Eriksson, "A Fast Channel Estimation Method for Disorderly Leaving Events in Vectored DSL Systems," in 2011 *IEEE International Conference on Communications (ICC)*, June 2011, pp. 1-6.

The invention claimed is:

1. A method, performed by a Vectoring Control Entity (VCE), for handling Disorderly Leaving Event (DLE) causing Sudden Termination Change (STC) in a Digital Subscriber Line (DSL) system, the method comprising:
when a DLE occurs on a line m in a vectored group of DSL lines, and the transmission on line m is at least partly continued:
obtaining at least one error sample from Customer Premises Equipments (CPEs) connected to other lines in the vectored group of DSL lines;
calculating an estimate of the channel coefficients (H') changed due to the DLE based on the at least one error sample, thereby providing a channel estimate; and
modifying a downstream precoder, based on the channel estimate, such that retraining of the other lines in the vectored group due to the DLE is avoided;
wherein the estimate of the channel coefficients is calculated based on the model H'=H+CΛH, where:
C is a near-end crosstalk coupling matrix for the CPE end of the vectored group;
Λ is a diagonal matrix with reflection coefficients, after the DLE, of the CPE-end of cables associated with the vectored group;
H is a matrix with the channel coefficients before the DLE; and
H' is a matrix with the estimated channel coefficients after the DLE.

2. The method of claim 1, wherein transmission of sync symbols on line m is continued after the DLE.

3. The method of claim 1:
wherein transmission in data symbol positions on line m before the DLE comprises a far-end crosstalk precompensation signal from other lines and a direct signal of line m; and
wherein the far-end crosstalk precompensation signal is continued after the DLE, such that the reflection of cross-talk from the other lines remains cancelled at the CPE end of line m.

4. The method of claim 3, wherein the direct signal transmitted on line m is reduced in power after the DLE, as compared to before the DLE.

5. The method of claim 1, further comprising applying one or more of the following for data symbol positions on line m after the DLE:
setting a gain scaling factor to zero, or close to zero; and
setting symbol constellation points to zero, or close to zero, in a symbol encoder.

6. The method of claim 1:
wherein transmission in data symbol positions on other lines than line m before the DLE comprises far-end crosstalk precompensation signals, including the precompensated signal from line m, and a direct signal of its own; and
wherein the far-end crosstalk precompensation signal from line m is stopped on the other lines, while the other signals are continued after the DLE.

7. The method of claim 6, wherein the far-end crosstalk precompensation signal from line m on other lines is reduced in power after the DLE, as compared to before the DLE.

8. The method of claim 1, wherein the obtaining of error samples comprises sending at least one error feedback request over:
an embedded operations channel in Very-High-bit-rate Digital Subscriber Line 2 (VDSL2); or
a robust embedded operations channel (ROC) in VDSL2; or
an embedded operations channel in G.fast; or
a robust management channel (RMC) in G.fast.

9. A Vectoring Control Entity (VCE) for handling Disorderly Leaving Event (DLE) causing Sudden Termination Change (STC) in a Digital Subscriber Line (DSL) system, the VCE comprising:
processing circuitry;
memory containing instructions executable by the processing circuitry whereby the VCE is operative to, when a DLE occurs on a line m in a vectored group of DSL lines, and the transmission on line m is at least partly continued:
obtain at least one error sample from Customer Premises Equipments (CPEs) connected to other lines in the vectored group of DSL lines;
calculate an estimate of the channel coefficients (H') changed due to the DLE, based on the at least one error sample, thereby providing a channel estimate;
modify a downstream precoder, based on the channel estimate, such that retraining of the other lines in the vectored group due to the DLE is avoided; and
calculate the estimate of the channel coefficients based on the model H'=H+CΛH, where:
C is a near-end crosstalk coupling matrix for the CPE end of the vectored group;
Λ is a diagonal matrix with reflection coefficients, after the DLE, of the CPE-end of cables associated with the vectored group;
H is a matrix with the channel coefficients before the DLE; and
H' is a matrix with the estimated channel coefficients after the DLE.

10. The VCE of claim 9, wherein the instructions are such that VCE is operative to continue transmission of sync symbols on line m after the DLE.

11. The VCE of claim 9:
wherein transmission in data symbol positions on line m before the DLE comprises a far-end crosstalk precompensation signal from other lines and a direct signal of line m; and
wherein the instructions are such that VCE is operative to continue the transmission of the far-end crosstalk precompensation signal after the DLE, such that the reflection of cross-talk from the other lines remains cancelled at the CPE end of line m.

12. The VCE of claim 9, wherein the instructions are such that VCE is operative to transmit the direct signal on line m with reduced power after the DLE, as compared to before the DLE.

13. The VCE of claim 9, wherein the instructions are such that VCE is operative to apply one or more of the following for data symbol positions on line m after the DLE:
setting a gain scaling factor to zero, or close to zero; and
setting symbol constellation points to zero, or close to zero, in a symbol encoder.

14. The VCE of claim 9:
wherein transmission in data symbol positions on other lines than line m before the DLE comprises far-end crosstalk precompensation signals, including the precompensated signal from line m, and a direct signal of its own;
wherein the instructions are such that VCE is operative to stop the far-end crosstalk precompensation signal from line m on the other lines, while other signals are continued after the DLE.

15. The VCE of claim 14, wherein the instructions are such that VCE is operative to reduce the far-end crosstalk precompensation signal from line m on other lines in power after the DLE, as compared to before the DLE.

16. The VCE of claim 9, wherein the obtaining of error samples comprises sending at least one error feedback request over:
an embedded operations channel in Very-High-bit-rate Digital Subscriber Line 2 (VDSL2); or
a robust embedded operations channel (ROC) in VDSL2; or
an embedded operations channel in G.fast; or
a robust management channel (RMC) in G.fast.

17. A Digital Subscriber Line Access Multiplexer (DSLAM), comprising:
a Vectoring Control Entity (VCE) for handling Disorderly Leaving Event (DLE) causing Sudden Termination Change (STC) in a Digital Subscriber Line (DSL) system, the VCE comprising processing circuitry and memory; the memory containing instructions executable by the processing circuitry whereby the VCE is operative to, when a DLE occurs on a line m in a vectored group of DSL lines, and the transmission on line m is at least partly continued:
obtain at least one error sample from Customer Premises Equipments (CPEs) connected to other lines in the vectored group of DSL lines;
calculate an estimate of the channel coefficients (H') changed due to the DLE, based on the at least one error sample, thereby providing a channel estimate;
modify a downstream precoder, based on the channel estimate, such that retraining of the other lines in the vectored group due to the DLE is avoided; and
calculate the estimate of the channel coefficients based on the model $H'=H+C\Lambda H$, where
C is a near-end crosstalk coupling matrix for the CPE end of the vectored group;
$\Lambda$ is a diagonal matrix with reflection coefficients, after the DLE, of the CPE-end of cables associated with the vectored group;
H is a matrix with the channel coefficients before the DLE; and
H' is a matrix with the estimated channel coefficients after the DLE.

* * * * *